April 27, 1937. G. R. GAGNE 2,078,631
LOCKING DEVICE
Filed July 1, 1933
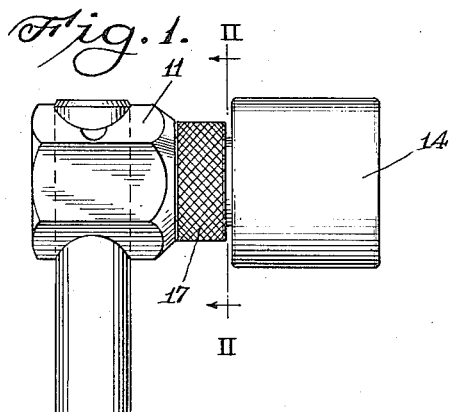
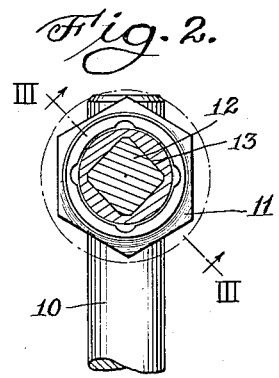
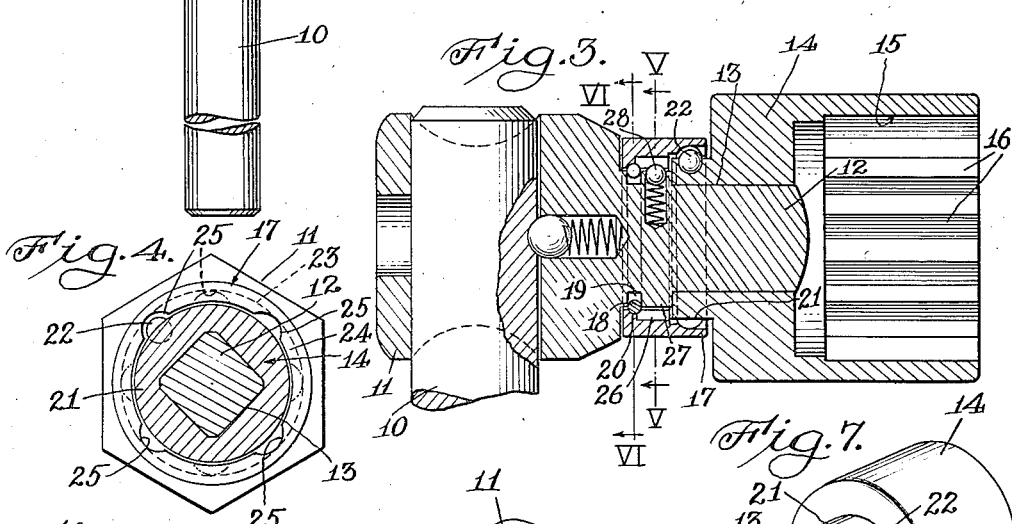
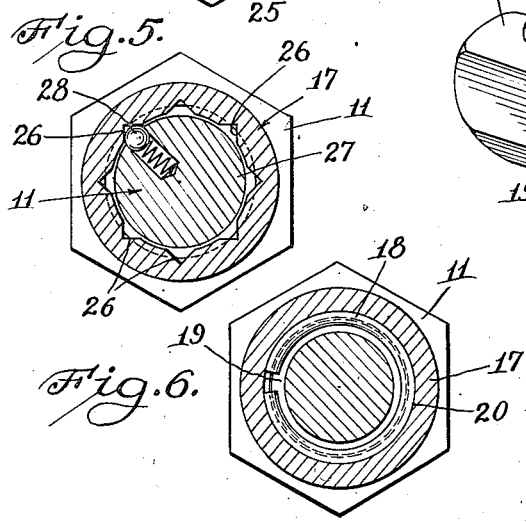
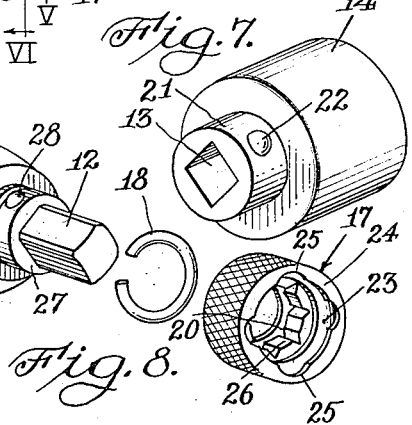
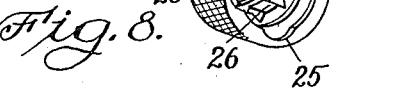
Inventor
Gideon R. Gagne
BY
Harry C. Lewis
Attorney Patented Apr. 27, 1937

2,078,631

UNITED STATES PATENT OFFICE 2,078,631

LOCKING DEVICE

Gideon R. Gagne, Kenosha, Wis., assignor to Snap-On Tools, Inc., Kenosha, Wis., a corporation of Delaware Application July 1, 1933, Serial No. 678,666

5 Claims. (Cl. 287—119)

This invention relates to couplers and more particularly to couplers for handle turning devices to effect detachable connection therewith, although certain features thereof may be employed with equal advantage for other purposes.

It contemplates more especially the provision of indexing means for instantly affording the connection and disconnection of devices in association with handle members for turning therewith.

Numerous types of detachable socket connections have heretofore been proposed for turning handles, but known expedients for this purpose are not positive in effecting rigid detachable joinder against any possible accidental removal and further entail too much time in effecting the desired connection or disconnection. For instance, sockets are rendered detachable from handle members so that substitutions in size may be readily accomplished for nut turning. On that account, the retaining expedient must be capable of ready manipulation so as to afford attachment and detachment without entailing much labor or time and the connection must be sufficiently rigid to give permanence and tight joinder substantially equal to a fixed head turning member.

Most expedients of this character are not sufficiently attach-proof to preclude accidental disassociation or removal for turning in opposite directions to the end that such proves very serious in restricted locations of nut turning. Moreover, the desired rigid connection is not afforded with known constructions, and for that reason have not served with the necessary advantage. Then, too, known expedients of the character mentioned require undue and restricted precision in effecting registry between the complemental parts and this minimizes the advantages of such couplers under commercial requirements of use.

One object of the present invention is to simplify the construction and improve the operation of devices of the character manufactured.

Another object is to provide improved means for detachably connecting devices with a turning handle member.

Still another object is to provide novel indexing means for detachably coupling devices to a turning handle with speed and minimum obstruction to effecting registry for connection or disconnection.

A further object is to provide new and novel means for establishing a detachable rigid joinder between complemental members.

A still further object is to provide indexing means to control a coupler between complemental members so as to afford a plurality of positions for registry to effect the connection and disconnection thereof.

Still a further object is the provision of novel indexing means for positively connecting complemental members so as to afford attachment and detachment without accidental removal in a variety of different positions to minimize time requirements in the utilization thereof.

Other objects and advantages will appear from the following description of an illustrated embodiment of the present invention.

In the drawing:

Figure 1 is a view in elevation of a device embodying features of the present invention, a wrench socket being shown in detachable connection with a handle turning device.

Figure 2 is a sectional view taken substantially along line II—II of Figure 1.

Figure 3 is a sectional view taken substantially along line III—III of Figure 2.

Figure 4 is a sectional view substantially similar to the view shown in Figure 2 with the socket in registry with the coupler for effecting connection or disconnection therebetween.

Figure 5 is a sectional view of the device taken substantially along line V—V of Figure 3.

Figure 6 is a sectional view taken substantially along line VI—VI of Figure 3.

Figure 7 is a perspective view of a detachable socket for use with the coupler shown in Figure 3.

Figure 8 is a perspective view of the coupler parts and turning head in their relative positions just prior to assembly.

The structure selected for illustration comprises an elongated handle 10 operatively connected to a turning head 11 of any customary or approved construction. The head 11 terminates in a polygonal extension 12, in this instance of square cross-sectional configuration, for telescopic association with a correspondingly formed bore 13 provided axially within a wrench socket body 14 designed, in this instance, for nut turning. It is obvious that the handle 10 together with the turning head 11 may be of any desired construction and configuration, and that the form thereof may be varied within a wide range depending upon the requirements or dictates of commercial practice.

As shown, the socket body 14 is provided with a broached or otherwise shaped socket 15 having the nut corner engaging grooves 16 thereof disposed longitudinal of the polygonal bore 13, the socket 15 communicating in this instance with polygonal bore 13 so as to afford the more convenient manufacture thereof. In order to retain the socket body 14 in detachable association with the polygonal extension 12, effective coupling means are provided for that purpose. The coupling means comprise, in this instance, a collar 17 having a circular bore provided axially therethrough for rotation on the handle head 11 proximate to the polygonal extension 12 thereon. The collar 17 is rotatively retained on the handle head 11 by means of a split wire ring 18 which is yieldingly disposed in confronting circumferential or annular grooves 19 and 20 provided in the handle head 11 and circular collar 17, respectively. In consequence thereof, the collar 17 is rotatively associated with the handle head 11 without any possible displacement therealong except for rotation relative thereto. The socket body 14 terminates in a reduced neck 21 which circumscribes the polygonal bore 13, it having a spring impelled detent or ball bearing 22 therein for reception by the collar 17.

As shown, the collar 17 is preferably provided with an annular groove 23 diametrically opposite detents 22, which has the end wall surface 24 interrupted by the provision of semi-spherical notches 25, in this four, equidistantly spaced in circumferential relation for registry with the correspondingly shaped detent 22 provided in the socket neck 21 for communication with the annular groove 23 of the collar 17. As a result, the socket body 14 is capable of telescopic association with the collar 17 responsive to the registry of the turning head extension 12 with the correspondingly polygonal socket bore 13, this being afforded and rendered possilbe when the detent 22 first registers with the notches 25 and thereupon the collar 17 is turned to preclude separation by the cooperation between the groove wall 24 and the detent 22. The socket body 14 is positively retained for detachable connection with the handle head 11 by mere rotation of the collar 17 so that the detent 22 traverses the annular groove 23 to remove the registry with the notches 25. Removal of the socket body 14 is rendered possible by merely rotating the collar 17 so as to bring the detent 22 in registry with any one of the notches 25, thereby permitting the ready separation thereof. Suitable indexing means are provided so that registry may readily be effected between the detent 22 and the notches 25.

The collar 17 may be knurled to enable the more convenient grasp thereof for rotation in either direction, and it is worthy of note that a single detent 22 will serve very effectively for the intended purpose of establishing a positive connection between the socket 14 and handle head 11, although any number thereof may be employed as commercial practice may dictate. Now, then, in order to index the position of the collar 17 so as to control, guide or readily determine the position of registry or non-registry between the detent 22 and collar notches 25, a plurality of notches 26, in this instance eight V-shaped circumferentially spaced grooves, are provided within the collar 17 to constitute indexing means. The circumferential series of notches 26 confront a peripheral shoulder 27 provided on the turning head 11 between the polygonal extension 12 thereof and the annular split spring retaining groove 19. As shown, the turning head shoulder 27 has a spring impelled detent or ball bearing 28 radially projecting therefrom in the path of the notches 26 for frictional engagement and lodgment therein. In consequence thereof, the collar 17 must be rotated against the frictional urge of the spring impelled detent 28 so as to click and afford increased resistance for further turning with the registry thereof and coincident lodgment in any one of the notches 26. This serves as an indicator and indexing means to determine the position of registry and non-registry between the socket detent 22 and the collar notches 25.

It is to be noted that the notches 26 are so spaced and arranged relative to the notches 25 so that there is alternate alignment therebetween in that the circumferential series of indexing notches 26 are exactly double in number. As a result, each time the indexing detent 28 becomes lodged in a notch 26, this prescribes a relative rotative position of exact registry or non-registry to an intermediate or complete connecting position between the socket 14 and turning head 11. Inasmuch as the socket detent 22 is radially positioned intermediate a flat surface of the polygonal bore 13 therein, it is noted that registry may be effected for connection or disconnection by rotating the collar 17 to the next succeeding position in either direction so that the notches 25 thereof will be positioned intermediate a flat surface of the turning head extension 12 as illustrated in Figure 4. Visual examination of the position of the collar 17 is not necessary, however, since the turning head extension 12 may be connectedly applied to the socket 14 so as to effect registry with the correspondingly shaped bore 13. Should it be impossible to project the socket 14 on the printing head shank 12 for a sufficient distance to effect a retaining connection therebetween, then it is only necessary to rotate the collar 17 in either direction until the next succeeding notch 25 is engaged by the indexing detent 28. In other words, the collar 17 need only be rotated in either direction until a click is heard or an increased turning force is necessary to displace the indexing detent 28 from the notch engaged thereby.

With the complete registry effected between the socket detent 22 and the collar notches 25, it is only necessary to turn the collar 17 in either direction to engage the next succeeding notch, thereby removing the socket detent 22 from registry with the collar notches 25 to preclude their separation in that the detent 22 will be confined within the annular groove 23 for engagement with the side wall or surface 24 thereof. It will be apparent, that a novel indexing device has been provided to enable the ready connection and disconnection between the socket 14 and its turning head 11 without entailing any appreciable time or labor. It is to be noted, further, that the detachable connection between the socket 14 and turning head 11 is effected with the desired rigidity of integral socket and handle member unit, since the elongated telescopic bearing relation between the polygonal extension 12 and socket bore 13 precludes lateral movement or play to a degree which will be noticeable or preclude its use with advantages equivalent to those possessed by an integral nut turning device such as a socket wrench of predetermined nut turning size.

Various changes may be made in the embodiment of the invention herein specifically described without departing from or sacrificing any of the advantages of the invention as defined in the appended claims.

I claim:

1. In a device of the character described, the combination with a handle member having a polygonal extremity, a turning member having a correspondingly shaped shank for detachable telescopic association with said handle extremity for turning therewith, a rotary collar of substantially lesser depth than said polygonal extension on one of said members for cooperation with the other of said members after said polygonal complemental means are in substantially complete telescopic association, and indexing means associated with said collar to direct the positions of connection and disconnection between said handle and turning members responsive to a fractional turn of said collar from a plurality of indexed positions, said indexing means including a circumferentially notched peripheral shoulder and resiliently mounted means confronting said notched shoulder to define said indexing positions.

2. In a device of the character described, the combination with a handle member having a polygonal extremity, a turning member having a correspondingly shaped shank for detachable telescopic association with said handle extremity for turning therewith, a collar rotatively mounted on said handle proximate to the polygonal extremity thereof, said polygonal extremity extending beyond said collar, complemental means on said collar and turning member to effect detachable joinder in a variety of positions after said polygonal complemental means are in telescopic association, said complemental means comprising alternately spaced elements of registry and non-registry on one of said members relative to a complemental element on the other of said members, and means associated with said collar for indexing a plurality of "off" and "on" positions between said handle and turning members so that joinder or separation between said members is responsive to a fractional turn from any of said "off" or "on" positions.

3. In a device of the character described, the combination with a handle member having a polygonal extremity, a turning member having a correspondingly shaped shank for detachable telescopic association with said handle extremity for turning therewith, a collar rotatively carried by said handle member, said polygonal extremity being of substantially greater length than said collar depth, complemental means on said members to effect attachment and detachment therebetween from a plurality of different rotative positions of said collar after or while said polygonal complemental means are in registry, comprising alternately spaced elements of registry and non-registry on one of said members relative to a complemental element on the other of said members, said coupling means having substantially the same number of elements of registry and non-registry as there are positions of complemental engagement between said handle and timing members, and means cooperating with said collar for indexing corresponding positions therefor to effect attachment or detachment responsive to a fractional turn of said collar from one indexed position to another.

4. In a device of the character described, the combination with a handle member having a polygonal extremity, a turning member have a correspondingly shaped shank for detachable telescopic association with said handle extremity for turning therewith, a collar rotatively mounted on said handle proximate to the polygonal extremity thereof, said polygonal extremity extending substantially beyond said collar, complemental means on said collar and turning member to establish a connection therebetween against removal after said polygonal complemental means are in telescopic association, a plurality of circumferentially spaced notches provided in said collar, a resiliently mounted member confronting said notches to index corresponding positions for said collar to effect connection or disconnection of said handle and turning member responsive to effecting a fractional relative turn from one indexed position to another.

5. In a device of the character described, the combination with a handle member having a polygonal extremity, a turning member having a correspondingly shaped shank for detachable telescopic association with said handle extremity for turning therewith, a collar rotatively carried by said handle member, confronting peripheral grooves in said handle member and collar, a split wire ring sprung into said confronting grooves to retain said collar on said handle member for rotation therewith, there being a circumferentially notched shoulder on said collar, means on said handle member for cooperation with the notches in said shoulder to define a plurality of indexed positions for said collar, and complemental means on said collar and turning member to effect attachment or detachment therebetween in a plurality of positions corresponding with said indexed collar for the purpose set forth.

GIDEON R. GAGNE.